(12) United States Patent
Yamakawa

(10) Patent No.: US 10,207,608 B2
(45) Date of Patent: Feb. 19, 2019

(54) VEHICLE SEAT

(71) Applicant: TACHI-S CO., LTD., Akishima-shi, Tokyo (JP)

(72) Inventor: Takumi Yamakawa, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/517,961

(22) PCT Filed: Aug. 13, 2015

(86) PCT No.: PCT/JP2015/072888
§ 371 (c)(1),
(2) Date: Apr. 9, 2017

(87) PCT Pub. No.: WO2016/059863
PCT Pub. Date: Apr. 21, 2016

(65) Prior Publication Data
US 2017/0305319 A1    Oct. 26, 2017

(30) Foreign Application Priority Data

Oct. 15, 2014 (JP) ................................. 2014-210791

(51) Int. Cl.
*B60N 2/58*        (2006.01)
*B29C 44/12*      (2006.01)
(Continued)

(52) U.S. Cl.
CPC ........ *B60N 2/5883* (2013.01); *B29C 44/1257* (2013.01); *B60N 2/06* (2013.01);
(Continued)

(58) Field of Classification Search
CPC .......... B60N 2/58; B60N 2/5883; B60N 2/68; B60N 2/6009; B60N 2/6027; B29C 44/1257
(Continued)

(56) References Cited

U.S. PATENT DOCUMENTS 3,102,755 A  *  9/1963  Wilfert ................ B60N 2/5825
                                                             297/218.1
3,747,178 A  *  7/1973  Harder, Jr. ............... B60N 2/70
                                                                 29/91.1
(Continued)

FOREIGN PATENT DOCUMENTS

JP         09-276089 A    10/1997
JP         11-89663 A      4/1999
(Continued)

OTHER PUBLICATIONS

International Search Report from International Patent Application No. PCT/JP2015/072888, dated Nov. 17, 2015.
(Continued)

*Primary Examiner* — Jose V Chen
(74) *Attorney, Agent, or Firm* — Shapiro, Gabor and Rosenberger, PLLC

(57) ABSTRACT

This seat for vehicles is provided with: a seat cushion frame that forms the skeleton of the seat part of the seat; a cushion material disposed on the seat cushion frame; and a trim cover that covers the cushion material. The seat cushion frame has a cushion side frame that supports the lateral lower section of the seat part of the seat, and a trim wire that is fixed to the cushion side frame. The ends of the trim cover have a pocket part sewn in a pocket shape, and are configured such that the trim cover is fixed by inserting the trim wire into the pocket part.

4 Claims, 7 Drawing Sheets

(51) Int. Cl.
*B60N 2/60* (2006.01)
*B60N 2/68* (2006.01)
*B60N 2/06* (2006.01)
*B29L 31/58* (2006.01)

(52) U.S. Cl.
CPC ......... *B60N 2/5825* (2013.01); *B60N 2/6009* (2013.01); *B60N 2/68* (2013.01); *B29L 2031/58* (2013.01)

(58) Field of Classification Search
USPC .............................. 297/218.1, 218.3, 218.5
See application file for complete search history.

(56) References Cited

U.S. PATENT DOCUMENTS

| | | | | |
|---|---|---|---|---|
| 4,740,035 A * | 4/1988 | Kazaoka | ................ | B60N 2/449 297/452.62 |
| 4,973,105 A * | 11/1990 | Itou | ........................ | B60N 2/161 297/218.1 |
| 5,560,677 A * | 10/1996 | Cykana | ................ | B60N 2/5825 297/218.3 |
| 5,820,212 A * | 10/1998 | Hoshino | .............. | B60N 2/5825 297/218.5 |
| 5,879,051 A * | 3/1999 | Cozzani | ............... | A47C 31/023 297/218.1 |
| 7,568,761 B2 * | 8/2009 | Mashimo | ............. | B60N 2/5825 297/218.1 |
| 7,891,735 B2 * | 2/2011 | Oku | ..................... | B60N 2/6009 297/218.3 |
| 7,942,477 B1 * | 5/2011 | Toba | ..................... | B60N 2/002 297/180.12 |
| 8,926,013 B2 * | 1/2015 | Kurashita | ............ | B60N 2/7011 297/218.3 |
| 9,987,960 B2 * | 6/2018 | Taguchi | ............... | B60N 2/5883 |
| 2002/0096932 A1 * | 7/2002 | Fujita | ....................... | B60N 2/58 297/452.56 |
| 2006/0255638 A1 * | 11/2006 | Kimura | ............... | B60N 2/6009 297/344.1 |
| 2010/0096899 A1 * | 4/2010 | Kato | ...................... | B60N 2/002 297/452.58 |
| 2010/0181818 A1 * | 7/2010 | Mashimo | ............. | B60N 2/5825 297/452.62 |
| 2015/0321589 A1 * | 11/2015 | Takei | ................... | B60N 2/6009 297/452.18 |
| 2016/0107556 A1 * | 4/2016 | Sosnowski | ............... | B60N 2/58 297/452.38 |
| 2016/0325659 A1 * | 11/2016 | Taguchi | ............... | B60N 2/5825 |
| 2017/0349066 A1 * | 12/2017 | Fujiwara | ............. | B60N 2/2893 |

FOREIGN PATENT DOCUMENTS

JP      2011-142976 A      7/2011
JP      2012-213525 A      11/2012

OTHER PUBLICATIONS

Office Action dated Oct. 16, 2018, in Japanese Patent Application No. 2014-210791.

* cited by examiner

VEHICLE SEAT

TECHNICAL FIELD

The present invention claims priority of a Japanese Patent Application No. 2014-210791 filed on Oct. 15, 2014, the content of which is incorporated herein by reference.

The present disclosure relates to a vehicle seat and is applicable to, for example, the end processing of a trim cover for a seat cushion.

BACKGROUND ART

In general, vehicle seats are configured by a seat cushion, a seat back upstanding on the back side, and the like. Then, the seat cushion or the seat back is configured by a seat cushion frame or a seat back frame, a pad material (cushion material) and a trim cover covered thereon as a skin material. For example, the end processing of the trim cover is carried out as follows (Japanese Patent Application Laid-Open No. H11-89663 (Patent Literature 1)).

A trim wire is secured along the outer peripheral verge of a seat frame for a seat cushion. Further, engaging brackets 6 for rotation prevention are secured to the trim wire of the seat frame. Hook members of J-shape that are attached by sewing to the ends of the trim cover covered to cover the pad material and the like are engaged with the engaging brackets in the state of being prevented from rotation.

CITATION LIST

Patent Literature

Patent Literature 1: Japanese Patent Application Laid-Open No. H11-89663

SUMMARY OF INVENTION

Technical Problem

Performing the end processing of the trim cover with the J-shape hooks as is in Patent Literature 1 results in a high cost.

The technical problem of the present disclosure is to provide a vehicle seat in which the end processing of the trim cover is carried out without using any J-shape hooks.

Other problems and novel features will be clarified from the description of the present disclosure and the attached drawings.

Solution to Problem

Of the present disclosure, the summary of one being typical will briefly be described as follows:

That is, the vehicle seat comprises a seat cushion frame forming a framework of a seat base for a seat, a cushion material disposed on the seat cushion frame, and a trim cover covering the cushion material. The seat cushion frame has a cushion side frame supporting a side lower portion of the seat base for the seat and a trim wire secured to the cushion side frame. An end portion of the trim cover has a pocket portion sewed into a pocket shape, and the trim cover is secured by the trim wire inserted into the pocket portion.

Advantageous Effects of Invention

According to the present disclosure, it is possible to improve the working property in assembling a vehicle seat.

DESCRIPTION OF EMBODIMENT

Figure 1:
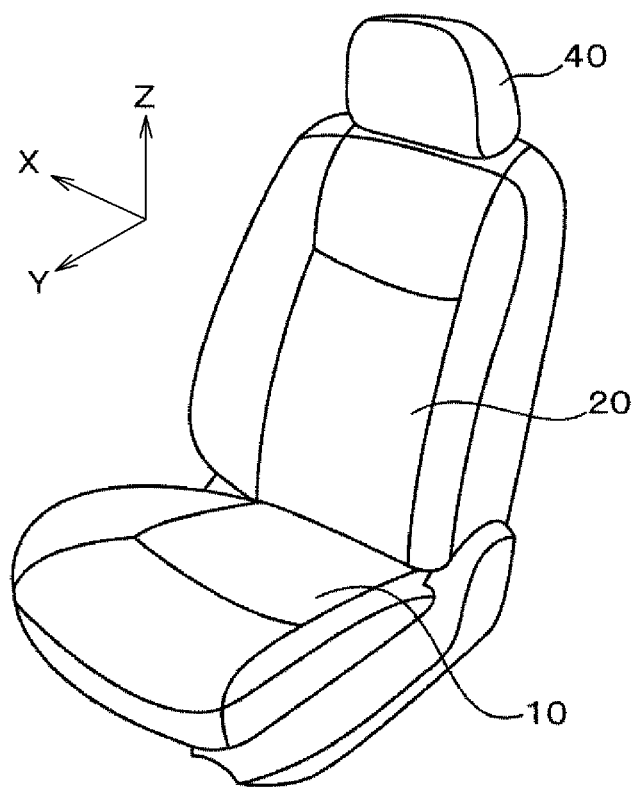
FIG. 1 is a perspective view of a vehicle seat according to an embodiment.

Hereinafter, an embodiment will be described with reference to the drawings. However, in the following description, the same components will be given the same reference numerals and will, on occasion, be omitted from being repetitively described. Incidentally, for more clearness, the drawings may schematically illustrated with respect to width, thickness, shape and the like of each part differently from actual forms. The drawings are, however, only one example and do not intend to limit the construction of the present invention.

First of all, the construction of a vehicle seat according to the embodiment will be described with reference to FIG. 1 and FIG. 2.

FIG. 1 is a perspective view of the vehicle seat according to the embodiment. FIG. 2 is a perspective view of a seat frame according to the embodiment.

As shown in FIG. 1, the vehicle seat 1 according to the embodiment is equipped with a seat cushion 10 and a seat back 20. The seat back 20 is equipped with a head rest 40 at its upper portion. The vehicle seat 1 is equipped with a seat reclining device referred to later, in which the seat back 20 is connected to be able to tilt relative to the seat cushion 10, so that the pivot movement of the seat back 20 can be restricted and so that the tilt angle of the seat back 20 is adjustable and settable at one's discretion. Incidentally, the vehicle seat 1 is mounted in a cabin of the vehicle so that the +Y direction becomes the forward side of the vehicle. The +X direction is referred as right, the −X direction is referred as left and the +Z direction is referred as upper side.

Figure 2:
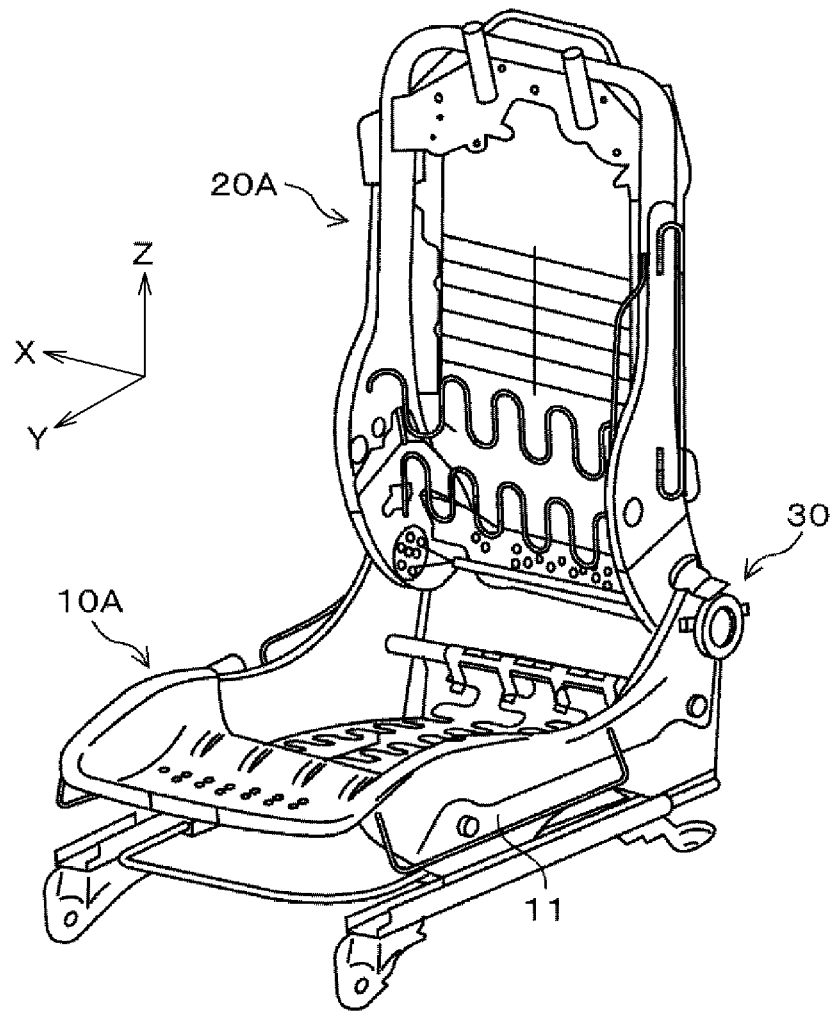
FIG. 2 is a perspective view of a seat frame configuring the vehicle seat according to the embodiment.

As shown in FIG. 2, a seat frame 1A configuring the vehicle seat is equipped with a seat cushion frame 10A configuring the seat cushion 10 and a seat back frame 20A configuring the seat back 20. The seat cushion frame 10A is equipped with cushion side frames 11 and slide rails 12 supporting the cushion side frames on both of right and left sides. The seat frame 1A is equipped with reclining devices 30 on both of right and left sides.

The seat cushion 10 and the seat back 20 are each configured by the seat cushion frame 10A or the seat back frame 20A, a pad material (cushion material) referred to later, and a trim cover covered as a skin material.

Next, with reference to FIG. 3 and FIG. 4, description will be made regarding the end processing of a trim cover for a vehicle seat relating to art (comparative example) that was examined in advance of the present invention.

Figure 3:
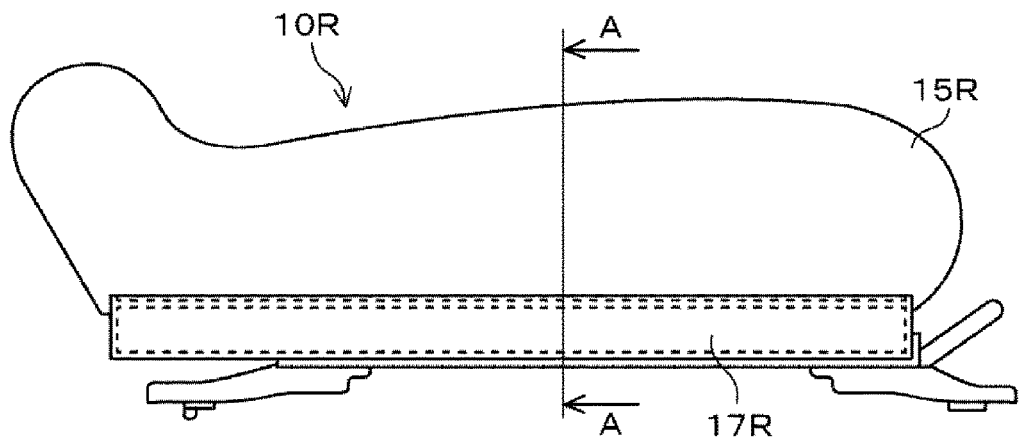
FIG. 3 is a side view of an important portion of a vehicle seat relating to a comparative example.
Figure 3:
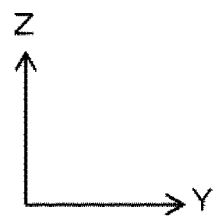
Figure 4:
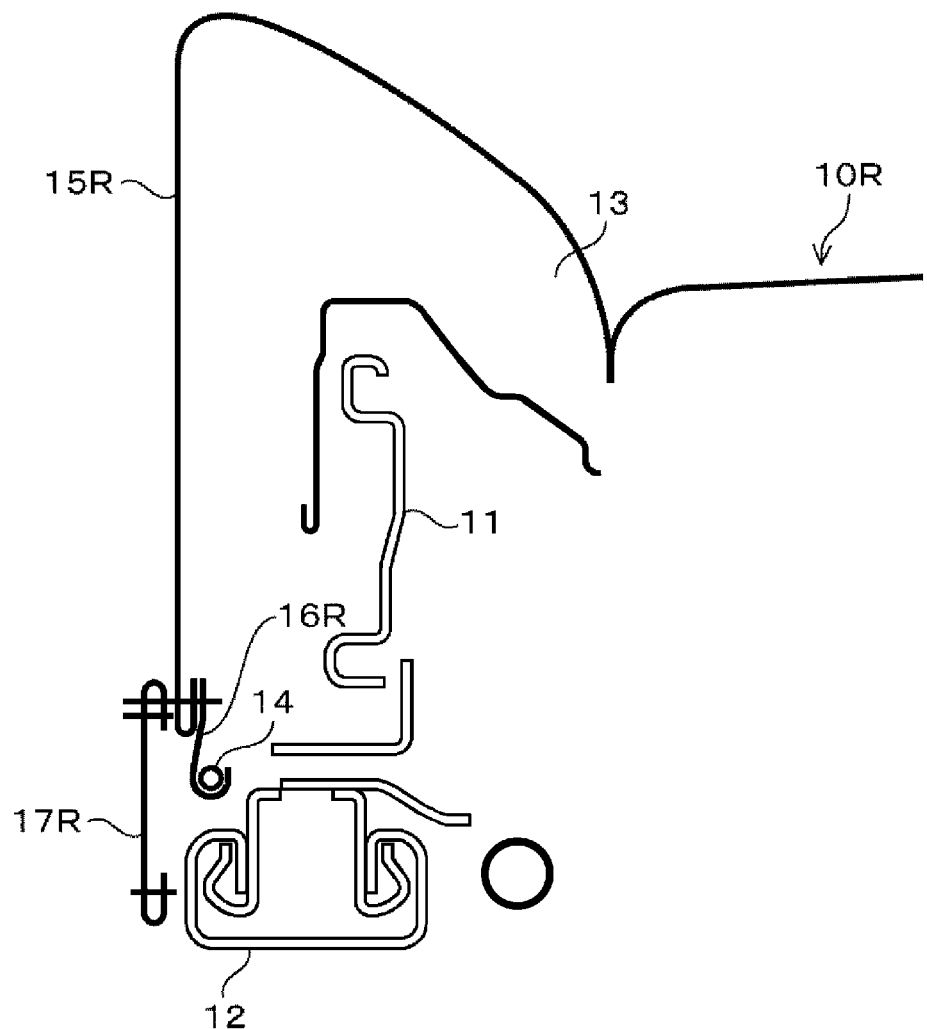
FIG. 4 is a sectional view of the important portion taken along A-A line in FIG. 3.

FIG. 3 is a right side view of an important portion of a vehicle seat relating to a comparative example. FIG. 4 is a sectional view of the important portion taken along A-A line in FIG. 3.

The vehicle seat 1R relating to the comparative example takes the same configuration as the vehicle seat 1 according to the embodiment except for end portions of the trim cover for a seat cushion. The seat cushion 10R is configured so that a cushion material 13 covered with a trim cover 15R is mounted on the seat cushion frame 10A. As shown in FIG. 4, a J-shape hook 16R attached by sewing to an end portion of the trim cover 15R is engaged with a trim wire 14 secured to the cushion side frame 11 on the right side. Further, as shown in FIG. 3 and FIG. 4, a configuration is taken that a hanging component 17R attached by sewing to the end portion of the trim cover 15R conceals the J-shape hook 16R, a slide rail 12 and the like.

The hanging component 17R is sewed with the both end portions turned up and down of a skin material being the same in material as the trim cover 15R. An extreme portion of the trim cover 15R is turned up, to which the hanging component 17R and the J-shape hook 16R are attached by sewing. Therefore, sewing is carried out three times at the end portion of the trim cover 15R.

Next, with reference to FIG. 5 through FIG. 7, description will be made regarding the end processing of the trim cover for the vehicle seat according to the embodiment.

Figure 5:
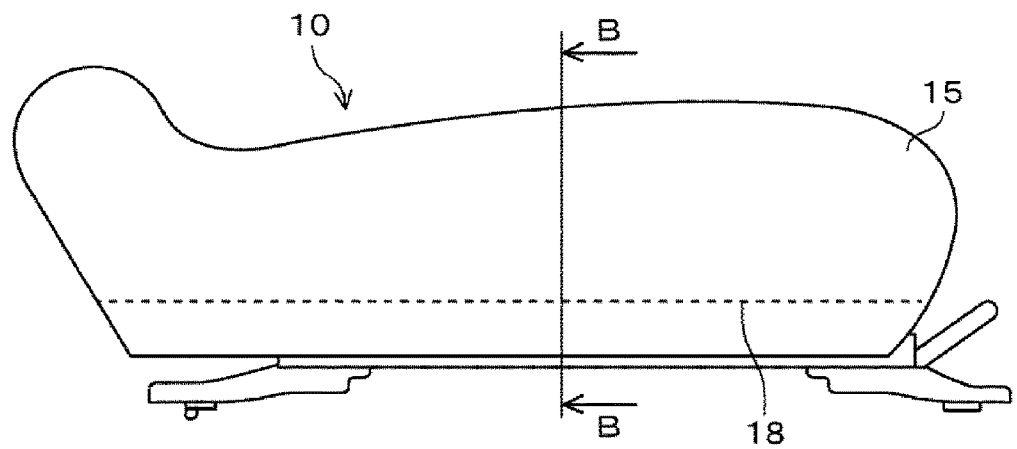
FIG. 5 is a side view of an important portion of the vehicle seat according to the embodiment.
Figure 5:
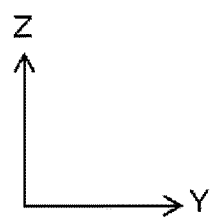
Figure 6:
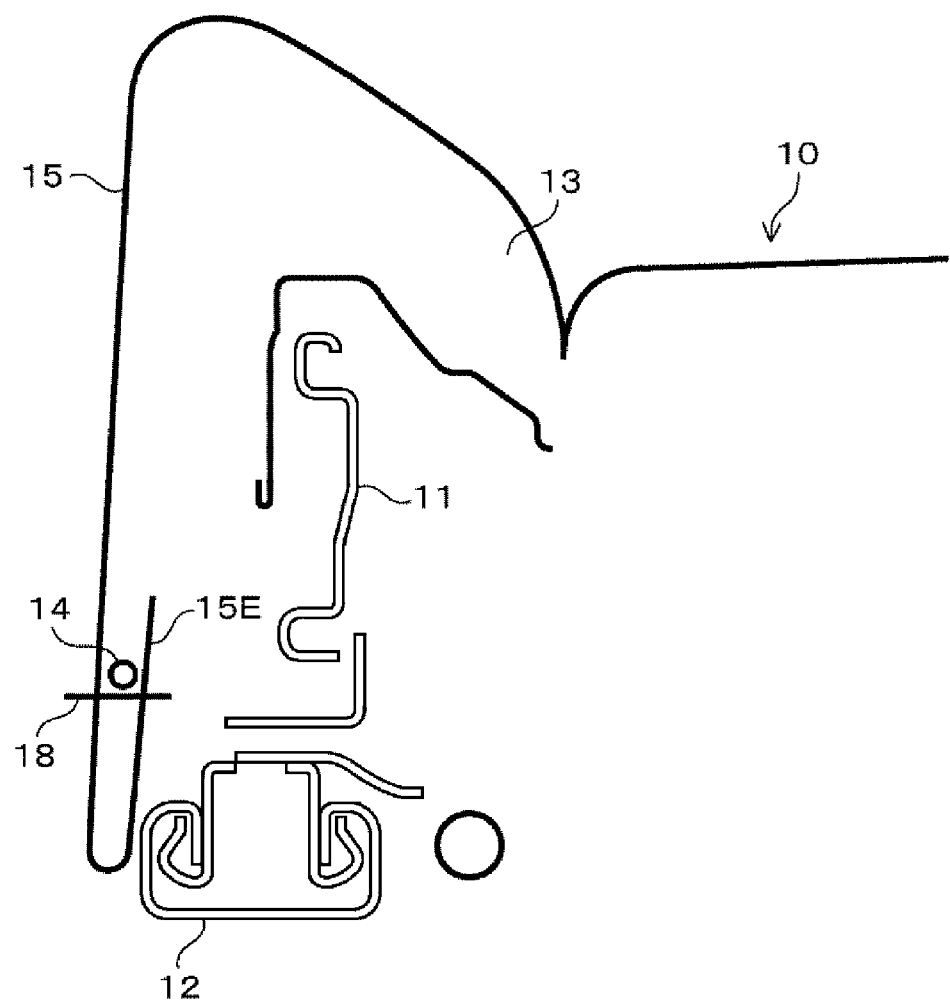
FIG. 6 is a sectional view of the important portion taken along B-B line in FIG. 5.

FIG. 5 is a right side view of an important portion of the vehicle seat according to the embodiment. FIG. 6 is a sectional view of the important portion taken along B-B line in FIG. 5. FIG. 7 is an enlarged sectional view of an end portion of the trim cover in FIG. 6.

The seat cushion 10 is configured so that a cushion material 13 covered by the trim cover 15 is mounted on the seat cushion frame 10A. As shown in FIG. 6 and FIG. 7, at the end portion of the trim cover 15, an extreme portion E is turned up inside (toward the seat cushion side frame side) and is sewed at a sewed portion 18 to form a pocket portion 15P. The pocket portion 15P that is configured by a first portion 15E between the extreme portion E and the sewed portion 18, a second portion 15F facing the first portion 15E and the sewed portion 18 engageably fixes (secures) the trim cover 15 to a trim wire 14 fixedly attached to the cushion side frame 11. The pocket portion 15P performs the same function as the J-shape hook 16R in the comparative example does. The sewed portion 18 exists to extend in the Y direction at the trim cover 15 for the side portion of the seat cushion 10. As a result, the trim wire 14 is disposed on the sewed portion 18 along the Y direction. Incidentally, on the surface of the trim cover 15, the sewed portion 18 exists intermittently.

Figure 7:
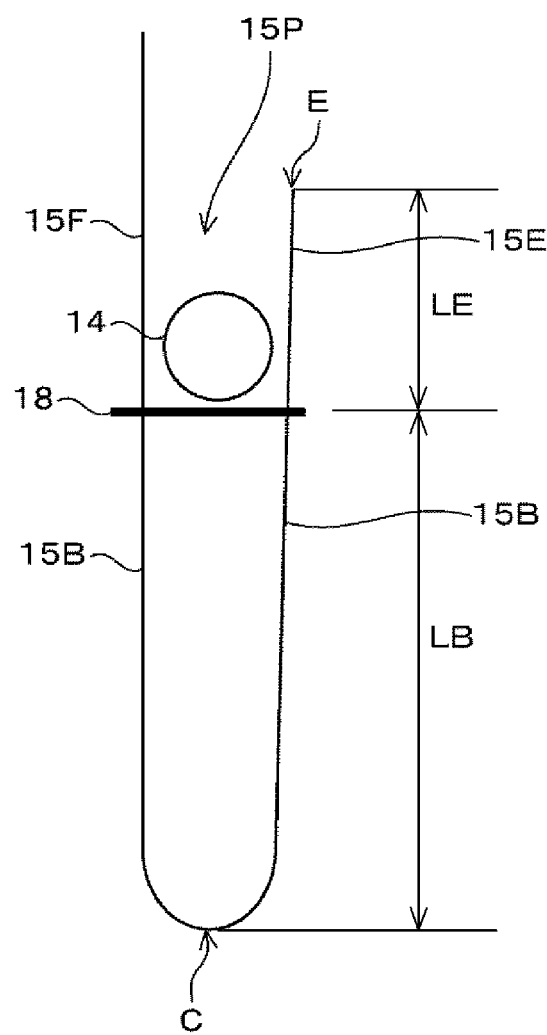
FIG. 7 is an enlarged sectional view of an end portion of a trim cover in FIG. 6.

As shown in FIG. 7, it is preferable that the length (LB) of the third portion 15B between the sewed portion 18 and the turn-up portion C is made to be longer than the length (LE) of the first portion 15E. Being made to be long, the third portion 15B performs the same function as the hanging component 17R in the comparative example does, and thus, it is possible to conceal the lower portion of the seat cushion side frame 11. Further, since the third portion 15B is formed to be long, it is easy to grip the third portion 15B. By gripping and pulling the third portion 15B down, it becomes easy to make engagement with the trim wire 14. Further, the end portion of the trim cover 15 is sewed once only and thus can become fewer in the number of sewing than that in the comparative example. Further, it is unnecessary to use the hanging component 17R and the J-Shape hook 16R as used in addition to the trim cover 15R in the comparative example. As a result, it is possible to enhance the working property in the end processing of the trim cover. Further, since the number of the components can be reduced, it is possible to reduce the cost.

Incidentally, although foregoing description has been made regarding the end processing of the trim cover on the right side of the seat cushion 10, the end processing of the trim cover on the left side may also be done in the same manner. That is, the foregoing end processing of the trim cover may be done on the right side only of the seat cushion 10 or the foregoing end processing of the trim cover may be done on the left side only of the seat cushion 10. Alternatively, the foregoing end processing of the trim cover may be done on both of the right and left sides of the seat cushion 10.

As described above, although the invention made by the present inventor has been described specifically based on the embodiment, it is needless to say that the present invention is not limited to the foregoing embodiment and can be modified variously.

REFERENCE SIGNS LIST

1: vehicle seat
1A: seat frame
10, 10R: seat cushion
10A: seat cushion frame
11: seat cushion side frame
12: slide rail
13: cushion material
14: trim wire
15, 15R: trim cover
16R: J-shape hook
17R: hanging component
18: sewed portion
20: seat back
20A: seat back frame
30: reclining device
40: head rest

The invention claimed is:
1. A vehicle seat comprising:
a seat cushion frame forming a framework for a seat cushion;
a cushion material disposed on the seat cushion frame; and
a trim cover covering the cushion material, wherein
the seat cushion frame has a seat cushion side frame supporting a side lower portion of the seat cushion frame and a trim wire secured to the seat cushion side frame, and
an end portion of the trim cover has a pocket portion sewed into a pocket shape,
wherein the pocket portion has the trim cover turned up inside and is provided with a sewed portion at a place that is at a predetermined length from an extreme portion of the trim cover, the pocket portion having a first portion between the extreme portion and the sewed portion, a second portion facing the first portion and a third portion between the sewed portion and a turn-up portion, the sewed portion connects a boundary between the first portion and one end of the third portion and a boundary between the second portion and another end of the third portion, and the trim cover is secured to the trim wire by the first portion, the second portion, and the sewed portion.

2. The vehicle seat according to claim 1, wherein the length of the third portion is made to be longer than the length of the first portion.

3. The vehicle seat according to claim 2, further comprising:

a slide rail supporting the seat cushion side frame on a lower side of the seat cushion side frame, wherein the third portion is configured to conceal the slide rail.

4. The vehicle seat according to claim 1, wherein another seat cushion side frame with secured trim wire is disposed on another side of the seat cushion frame, the pocket portion is one of two such pocket portions disposed at opposite end portions of the trim cover, and each of the opposite end portions of the trim cover is secured to a respective one of the trim wires by the first portion, the second portion and the sewed portion of the corresponding pocket portion.

* * * * *